Figure 1:
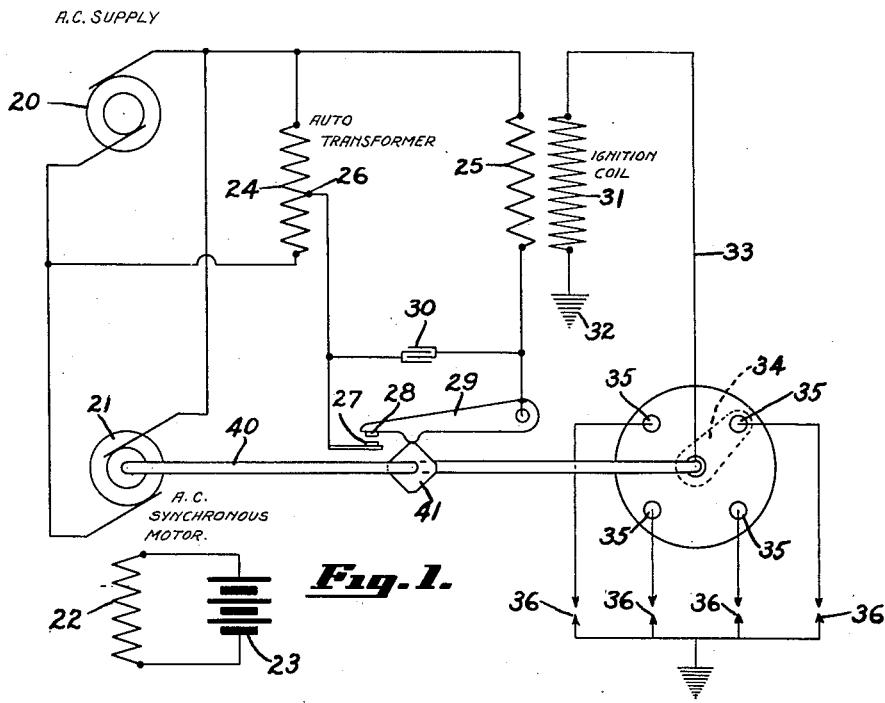

July 15, 1924.

J. H. HUNT 1,501,487

IGNITION SYSTEM

Filed Nov. 19, 1920

2 Sheets-Sheet 1

Witnesses

Irvin A. Greenwald
Walter H. Rieder

Inventor
John H. Hunt

By Forrest B. MacNab
Attorney

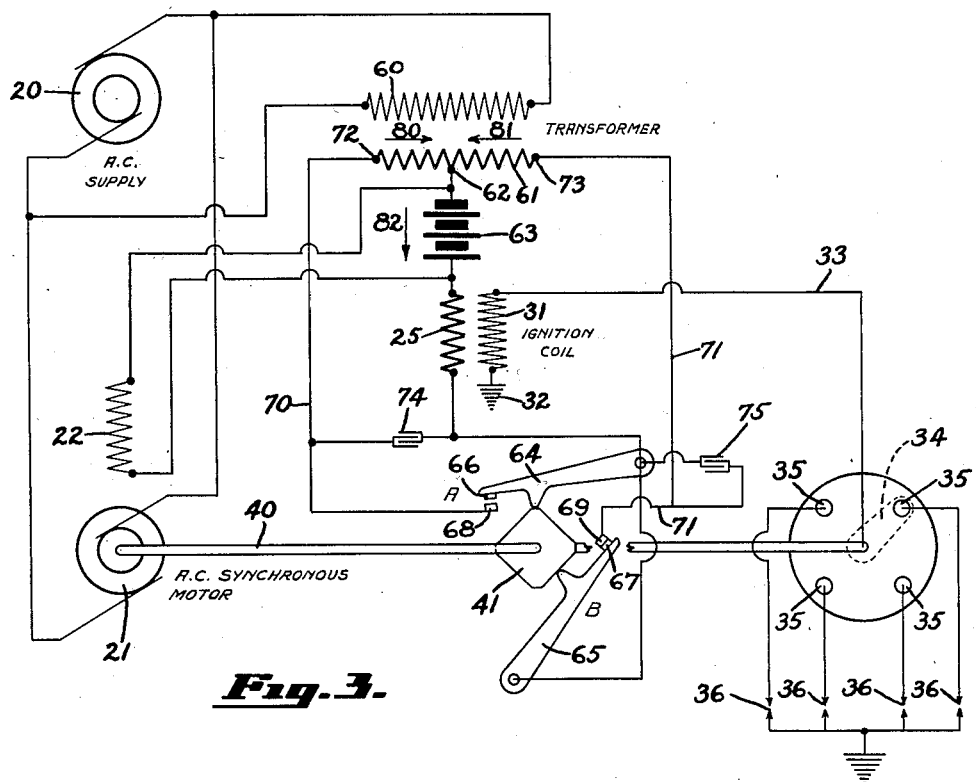
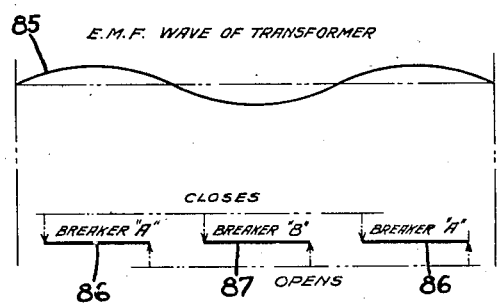

Patented July 15, 1924.

1,501,487

UNITED STATES PATENT OFFICE.

JOHN H. HUNT, OF DAYTON, OHIO, ASSIGNOR TO THE DAYTON ENGINEERING LABORATORIES COMPANY, OF DAYTON, OHIO, A CORPORATION OF OHIO.

IGNITION SYSTEM.

Application filed November 19, 1920. Serial No. 425,239.

*To all whom it may concern:*

Be it known that I, JOHN H. HUNT, a citizen of the United States of America, residing at Dayton, county of Montgomery, and State of Ohio, have invented certain new and useful Improvements in Ignition Systems, of which the following is a full, clear, and exact description.

This invention relates to ignition apparatus for devices requiring for their operation a series of electric sparks such as, for example, electrically ignited fuel burners.

It is well known that ignition impulses for internal-combustion engines may be obtained from an alternating current by mechanically connecting the current generator and the different moving parts of the ignition system with the engine to effect a correct correlation and timing of operation of the different parts. This connecting of all parts to cause them to operate in synchronism is used because all parts are mounted on the prime mover and are moved about with the latter. Burners operating on fluid fuels are used commercially and in house heating systems and owing chiefly to the fact that blowers are used with these burners, it has been found preferable to provide sparks at frequent intervals in the burners to insure continuous operation of the latter. The principal objects of the present invention are to utilize in the production of current impulses for an ignition system for fuel burners for furnaces and the like, the alternating current in a power, lighting or other circuit in which the current source is so placed that mechanical connection between the current generating device and the ignition system is impossible or undesirable.

In carrying out the foregoing object it is a further object to provide means for supplying unidirectional current for charging a storage battery, exciting the field of an alternating current motor and other purposes.

Further objects and advantages of the present invention will be apparent from the following description, reference being had to the accompanying drawings, wherein preferred embodiments of the present invention are clearly shown.

In the drawings:

Fig. 1 is a wiring diagram of one form of the invention.

Figure 2:
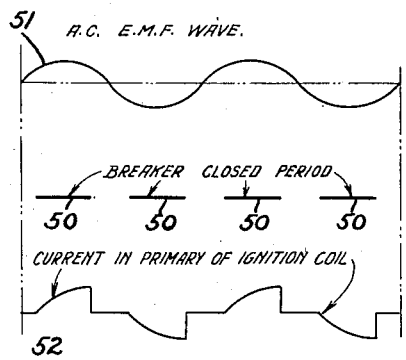

Fig. 2 is a chart showing the relation between the A. C. E. M. F. wave, the closed period of the ignition breaker and the current in the primary of the ignition coil.

Fig. 3 is a wiring diagram showing a modified form of the invention.

Fig. 4 is a chart showing the E. M. F. wave of the transformer shown in Fig. 3 and the operation of the breakers.

Referring to Fig. 1, 20 designates an A. C. generator which is connected to an A. C. synchronous motor 21. Motor 21 has a field 22 separately excited by a battery 23. The dynamo 20 is connected with an auto transformer 24 having one end thereof connected with ignition coil primary 25 and an intermediate point 26 thereof connected with a stationary contact 27. Contact 27 cooperates with movable contact 28 mounted on lever 29 which is connected with ignition coil primary 25. A condenser 30 is connected in shunt with contacts 27 and 28. The ignition coil secondary 31 is grounded at 32 and connected by 33 with a distributor movable contact 34 which distributes to the various contacts 35 each connected with a grounded spark plug 36. Each plug 36 may be associated with a separate fuel burner so that the system may be keeping several fuel burners lighted at the same time. The shaft 40 of the motor 21 drives timer cam 41 and the distributor rotor 34 in synchronism with the operation of the dynamo 20.

As shown in Fig. 2 the lines 50 represent the closed period of the contacts 27 and 28. It is noted that these contacts are separated shortly after the peak of the E. M. F. wave 51 has been reached. It is intended that the current in the primary winding 25 shall be broken when the A. C. current wave is substantially at its peak. Since the current wave lags behind the E. M. F. wave, it is apparent that the breaker timing indicated in the chart, Fig. 2, is substantially correct. The wave 52 showing the current in the primary of the ignition coil shows that this current has first a plus value and then a minus value depending upon whether the E. M. F. wave of the source of supply is plus or minus.

It is apparent then that the motor 21 constitutes a synchronizing device which is not mechanically connected with the source of supply. In this manner it is possible to provide for the control of an ignition timer although the ignition apparatus may be removed considerable distance from the source of current supply.

In Fig. 3 current from the A. C. supply 20 is reduced in voltage before delivery to the ignition coil primary 25 by means of a transformer having a coil 60 formed with a relatively large number of turns connected directly with the supply 20, and with a winding of fewer turns 61. At substantially the middle point 62 winding 61 is connected with a storage battery 63 which in turn is connected through primary winding 25 with breaker levers 64 and 65 carrying movable contacts 66 and 67 respectively. Contact 66 cooperates with contact 68 which is connected by wire 70 with end terminal 72 of coil 61. Contact 67 cooperates with contact 69 which is connected by wire 71 with end terminal 73. Condenser 74 is connected in shunt with contacts 66 and 68 and condenser 75 is in shunt with contacts 67 and 69. The field winding 22 of synchronous motor 21 is connected with the storage battery 63.

Members 64, 66, and 68 constitute the breaker A and the members 65, 67, and 69 constitute breaker B. The cam 41 is so located on the motor shaft 40 that breaker A opens when the E. M. F. wave 85 of the transformer has a positive value, while the breaker B opens when this wave has a negative value. In Fig. 4, line 86 represents the closed period of breaker A; line 87, the closed period of breaker B. Since the passage of current through the battery 63 and the primary 25 is controlled by breakers A and B the current passing through these devices will be unidirectional although intermittent. For example if the closing of breaker A causes current to flow in the direction of arrows 80 and 82 the closing of breaker B while breaker A is open will cause current to flow in the direction of arrows 81 and 82. In this manner the storage battery 63 is being charged while the ignition coil is being energized to provide ignition for the various sparking devices 36.

It will be readily understood that in order that the timer may synchronize the break of the ignition current with the alternating current E. M. F. wave the number of lobes on the timer cam must be equal to the number of poles on the motor, or be a divisor of the number of poles. If there is a gear reduction between the cams and the motor, the ratio of this reducton must be an even number, for example, 2 or 3, and the number of lobes multipled by the gear ratio must equal the number of poles of the motor, or be a divisor of the number of poles.

It is apparent that the present invention can be readily applied to industrial use for igniting liquid fuel burners where A. C. is available and where direct current is not available.

While the forms of mechanism herein shown and described constitute preferred forms of embodiment of the invention, it is to be understood that other forms might be adopted, all coming within the scope of the claims which follow.

What I claim is as follows:

1. In an ignition system, the combination with a source of alternating current; of an ignition coil; a mechanically operated timer; and means mechanically separate from said source for operating said timer in synchronism therewith.

2. In an ignition system, the combination with a source of alternating current; of an ignition coil; a transformer connected with said source; a timer including contacts and a timer cam for controlling the connection between said coil and transformer; and a synchronous motor connected with said source for driving said timer cam in synchronism therewith.

3. In an ignition system, the combination with a source of alternating current; of an ignition coil; a transformer; a storage battery; mechanically operated timing means for controlling connections between the storage battery and the transformer and between the transformer and coil; and means mechanically separate from said current source for operating said timer in synchronism with said current source, whereby said battery will receive current in one direction only, and the current in the ignition coil will be interrupted in synchronism with said current source.

4. In an ignition system, the combination with an alternating current source; of a battery; an ignition coil; mechanically operated timing means for causing current to flow intermittently to said coil and in one direction to said battery; and means mechanically separate from said current source for operating said timing means in synchronism with said current source.

5. In an ignition system, the combination with a source of alternating current; of an ignition coil; a timer including contacts and a timer cam; and a synchronous motor connected with said source for driving the timer cam in synchronism therewith.

6. In an ignition system, the combination with a source of alternating current; of an ignition coil; a transformer; a storage battery; timing means including rotatable elements for controlling connections between the transformer and battery and between the transformer and coil; and a synchronous motor for rotating sail element in synchronism with the current source, whereby the battery will receive unidirectional current and the current in the ignition coil will be interrupted in synchronism with the current source.

7. In an ignition system, the combination with a source of alternating current; of a battery; an ignition coil; timing means including a rotatable element for causing current to flow intermittently to said coil and unidirectionally to said battery; and a synchronous motor connected with said current source for driving said element.

8. In an ignition system, the combination with a source of alternating current; of a transformer; a storage battery; an ignition coil; a switch including contacts connected in series with the battery coil, and a portion of the turns of a transformer winding; another switch including contacts connected in series with the battery coil, and another portion of the turns of said transformer winding; and means mechanically separate from the current source for producing closing and opening of said switches alternately in synchronism with the current source.

9. In an ignition system, the combination with a source of alternating current; of a transformer; a storage battery; timing mechanism including two stationary contacts and two breaker levers each carrying a movable contact cooperating with a stationary contact; and a cam for actuating said levers alternately; means connecting the breaker levers with the coil battery, and an intermediate turn of a winding of the transformer, and connecting each of the movable contacts with one of the end turns of said transformer winding; and means mechanically separate from the current source for rotating said cam in synchronism with the current source.

In testimony whereof I hereto affix my signature.

JOHN H. HUNT.

Witnesses:
H. E. SOLLENBERGER,
C. DALE MILLER.